United States Patent
Haake et al.

(10) Patent No.: US 8,756,165 B1
(45) Date of Patent: Jun. 17, 2014

(54) PACKING AND VEHICLE LOADING FOR ORDER FULFILLMENT

(75) Inventors: Paul N. Haake, Seattle, WA (US);
Dennis Lee, Mercer Island, WA (US);
Neha Gupta, Redmond, WA (US);
Andrew Sean Tyra, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 466 days.

(21) Appl. No.: 12/643,069

(22) Filed: Dec. 21, 2009

(51) Int. Cl.
*G06Q 30/00* (2012.01)
*G06Q 10/08* (2012.01)

(52) U.S. Cl.
CPC .................. *G06Q 10/0832* (2013.01)
USPC .......................................... 705/332; 705/337

(58) Field of Classification Search
CPC ................................................ G06Q 10/0832
USPC ................................................ 705/332, 337
See application file for complete search history.

(56) References Cited

U.S. PATENT DOCUMENTS

| | | | |
|---|---|---|---|
| 2002/0123944 A1* | 9/2002 | Williams et al. | 705/29 |
| 2003/0033825 A1* | 2/2003 | Goosman | 62/239 |
| 2004/0004119 A1* | 1/2004 | Baldassari et al. | 235/384 |
| 2004/0128134 A1* | 7/2004 | Sacks et al. | 704/270 |
| 2004/0202154 A1* | 10/2004 | Aklepi et al. | 370/352 |
| 2006/0089863 A1* | 4/2006 | Belleau et al. | 705/6 |
| 2007/0088628 A1* | 4/2007 | Hopson et al. | 705/27 |
| 2008/0065262 A1* | 3/2008 | Gottlieb et al. | 700/213 |

OTHER PUBLICATIONS

Chajakis et al., "Scheduling Deliveries in Vehicles with Multiple Compartments", Journal of Global Optimization, 26: 47-78, 2003.*
Merriam-Webster.com, "Adjacent", retrieved May 5, 2007, available at: http://web.archive.org/web/20070505060617/http://www.merriam-webster.com/dictionary/adjacent.*
Premium Refreshment Service, "How Delivery Works", accessed Jun. 9, 2009 https://web.archive.org/web/20090609001917/http://premiumrefreshment.com/bottled_water/how_delivery_works.aspx.*

* cited by examiner

*Primary Examiner* — Kevin Flynn
(74) *Attorney, Agent, or Firm* — Thomas | Horstemeyer, LLP

(57) ABSTRACT

Disclosed are various embodiments for facilitating packing and vehicle loading for order fulfillment. A number of totes associated with each one of a plurality of orders fulfilled in a fulfillment center are tracked in a computing resource. Each of the orders specifies at least one item. A plurality of compartment assignments in a delivery vehicle are generated for the totes associated with each of the orders, the delivery vehicle having a plurality of storage compartments.

14 Claims, 4 Drawing Sheets

PACKING AND VEHICLE LOADING FOR ORDER FULFILLMENT

BACKGROUND

Online merchants facilitate local fulfillment of orders for local delivery. Items such as perishable items may be delivered daily by delivery vehicles to delivery stops. The weight and volume of items can vary widely from one delivery stop to the next. Heavier items present a problem in that they can cause physical injury to personnel over time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
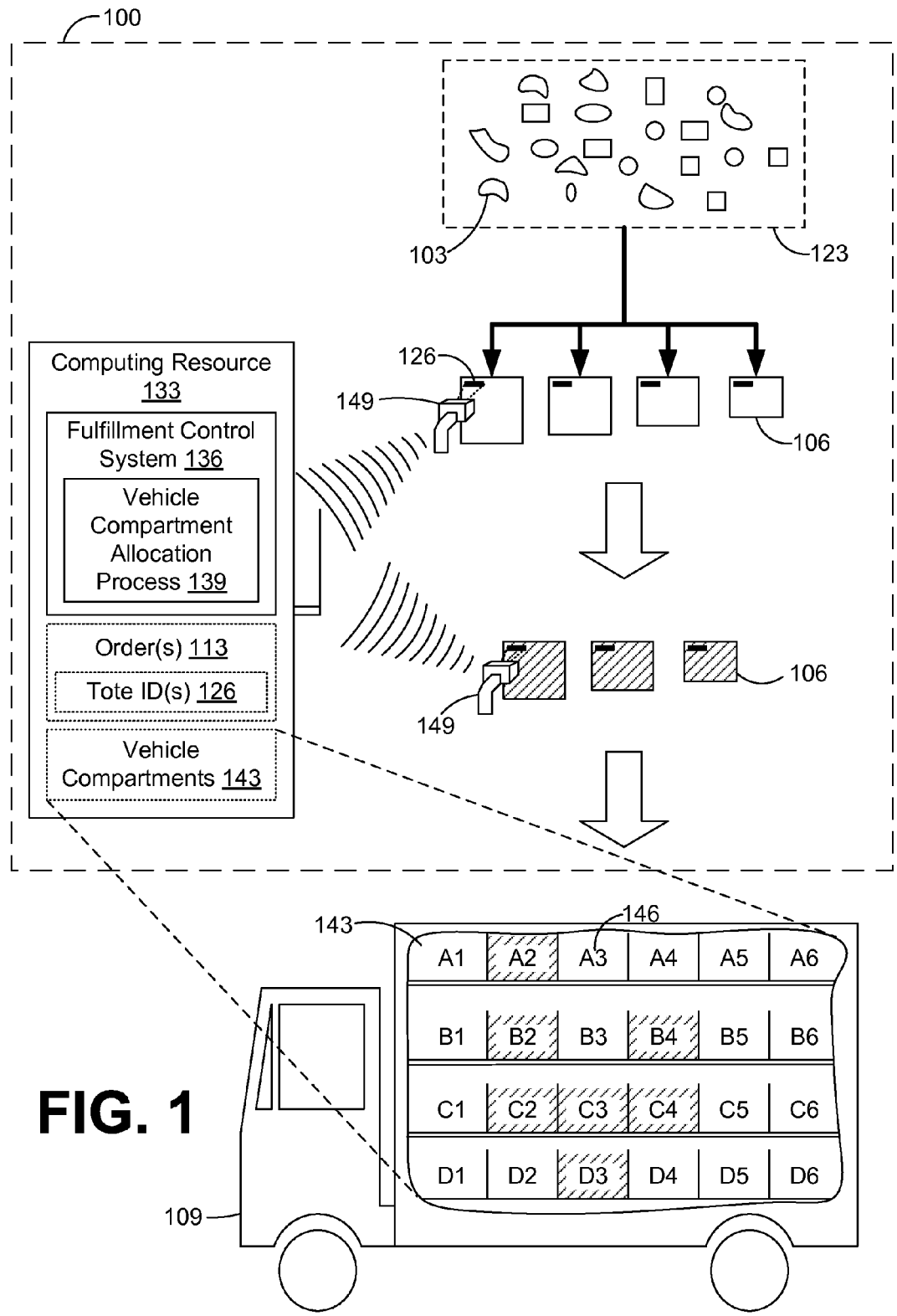
FIG. 1 is a drawing of a portion of a materials handling facility according to various embodiments of the present disclosure.

With reference to FIG. 1, shown is a portion of a materials handling facility 100 according to an embodiment of the present disclosure. The materials handling facility 100 may comprise, for example, a fulfillment center that fulfills orders for items 103 offered by a merchant through the Internet, telephone system, mail, or other channel. The portion of the materials handling facility 100 depicted specifically relates to packing and shipping areas in which items 103 are placed in totes 106 that are ultimately loaded onto delivery vehicles 109. The materials handling facility 100 may include various conveyors, carts, and other equipment that are used in a sorting process to coalesce items 103 of respective orders 113 to be packaged and loaded onto a delivery vehicle 109 for delivery to customers.

Specifically, various personnel inside a materials handling facility 100 such as pickers and other handlers will obtain items 103 from inventory to fulfill customer orders 113. Such items 103 may be moved by conveyors, carts, and other materials handling equipment to an assembly area 123. In the assembly area 123, items 103 that are subject to specific orders 113 are coalesced together for packing. The items 103 are packed into totes 106 that are ultimately loaded onto the delivery vehicle 109 as will be described. In another embodiment, items 103 subject to orders 113 are coalesced together when they are removed from bins, shelves, or other inventory locations and placed in totes 106 by pickers, thus eliminating the step of bringing such items 103 together in the assembly area. Before further description of the operation of the materials handling facility 100 is provided, first a discussion of the physical elements of the materials handling facility 100 and the delivery vehicle 109 are provided.

In order to control the operation of the various components of the materials handling facility 100, the materials handling facility 100 includes a computing resource 133 that may comprise one or more computing devices such as, for example, one or more servers or other computing systems as can be appreciated. Such servers may comprise, for example, a server computer or like system. The computing resource 133 may comprise, for example, multiple such servers arranged in one or more server banks or other arrangements. Such servers may be located in a single installation or may be dispersed among many different geographical locations. To this end, the computing resource 133 may be viewed as a server "cloud," for example, that represents the computing capacity of multiple server computers, etc.

Various applications and systems may be executed by the computing resource 133 in order to orchestrate the operation of the materials handling facility 100. To this end, such applications may include a fulfillment control system 136. The fulfillment control system 136 includes a vehicle compartment allocation process 139 that specifically determines where packed totes 106 are placed within a delivery vehicle 109 as will be described.

In addition, various data may be stored in a memory associated with a computing resource 133 that is manipulated by the fulfillment control system 136. Such data may include information describing orders 113 that include a listing of the items 103 that are the subject of an order 113, information about the respective customer such as name, delivery address, payment instruments, and other information as can be appreciated. In addition, associated with each of the orders 113 is/are one or more tote identifiers 126 as will be described. By virtue of the fact that tote identifiers 126 are associated with individual orders 113 in the computing resource 133, then respective totes 106 may be associated with the orders 113 for purposes of handling the totes 106 as they are loaded on the delivery vehicle 109 as will be described.

The delivery vehicle 109 includes several vehicle compartments 143. Such vehicle compartments 143 may be considered storage compartments for the storage of packed totes 106 during delivery as will be described. Stored within a memory associated with the computing resource 133 is data that represents the vehicle compartments 143. The data representing the vehicle compartments 143 is used to track a status of each vehicle compartment 143 in a respective delivery vehicle 109 as will be described. The status of each vehicle compartment 143 may include a status bit that toggles between "empty" or "occupied." In addition, if a tote 106 that includes items 103 is placed on or in a given vehicle compartment 143, a tote identifier 126 and/or an identifier indicating an order 113 may be associated with such vehicle compartment 143 in order to track where the totes 106 holding the items 103 for a given order 113 are located. Alternatively, compartment identifiers 146 may be associated with respective orders 113, etc.

Personnel within the materials handling facility 100 may employ various input devices 149 such as handheld scanners that are used to scan bar codes such as tote identifiers 126, etc. Such input devices 149 are configured to communicate with the computing resource 133 via wireless communication or over an appropriate network (not shown). To this end, such input devices 149 facilitate the input of tote identifiers 126 and other data relevant to the operation of the fulfillment control system 136 as will be described.

The input devices 149 may also comprise, for example, keyboards, key pads, microphones, and other input devices. In one embodiment, the tote identifiers 126 comprise bar codes that are scanned by input devices 149 comprising scanners. Alternatively, the tote identifiers 126 may be expressed in terms of characters or indicators other than bar codes.

The vehicle compartments 143 may comprise, for example, designated spaces on shelves, cubbyholes, racks, or other structures. Where the vehicle compartments 143 comprise spaces on shelves, such spaces may be defined by dividers that may be stationary or movable. The vehicle compartments 143 are each designated to hold a predefined amount of weight. In one embodiment, the vehicle compartments 143 are arranged in rows, where a weight limit is associated with all of the vehicle compartments 143 for each row. For example, the uppermost vehicle compartments 143 (i.e., compartments A1-A6) may be assigned a lower weight limit and the lowermost vehicle compartments 143 may be assigned greater weight limits. Stated another way, the vehicle compartments 143 at the lowest point of the delivery vehicle 109 may be configured to hold totes 106 having the highest weight. Such may accord with various rules and laws in place governing the manual handling of totes 106 so as to prevent repetitive injuries and other problems.

For example, in one embodiment, the lowest vehicle compartments 143 may be designated for the storage of totes 106 weighing 40 pounds or less. The second highest vehicle compartments 143 may be designated to hold totes 106 weighing 27 pounds or less. The third highest vehicle compartment 143 may be designated to hold totes 106 weighing 25 pounds or less. Finally, the highest vehicle compartments 143 may be designated to hold totes 106 that weigh 20 pounds or less. By virtue of the fact that different weight limits are assigned to respective vehicle compartments 143 based upon their height within the delivery vehicle 109, individuals who load the delivery vehicle 109 are prevented from lifting heavier totes 106 too high, thereby preventing back injuries or other problems.

Given that totes 106 having specific weights must be placed within specific vehicle compartments 143 designated to handle such weights, according to various embodiments, the vehicle compartment allocation process 139 is configured to determine where individual totes 106 associated with an order 113 are to be placed within a delivery vehicle 109.

According to one embodiment of the present disclosure, the items 103 associated with each order 113 are packed in groups of totes 106 that vary in weight in proportion to a weight limit distribution of the vehicle compartments 143 of the respective delivery vehicle 109 in which the totes 106 are to be delivered. In some cases, an order 113 may only require a single tote 106. To this end, the weight at which orders 113 having a single tote 106 may vary from order 113 to order 113 according to the weight limit distribution of the vehicle compartments 143. In other cases, an order 113 may only require a small number of totes 106 that cannot account for each different weight limit in the weight limit distribution of the vehicle compartments 143 of a respective delivery vehicle 109. To this end, the totes 106 are packed up to respective weights that match the weight limit distribution of the vehicle compartments 143 to the extent possible.

This prevents a problem that would otherwise be created if each of the totes 106 is packed up to one of the weight limits designated for a given number of vehicle compartments 143 of a delivery vehicle 109. For example, if the weight limit distribution is the same as the example cited above (i.e., 20, 25, 27, and 40 pound limits) and each of the totes 106 is packed to 27 pounds, then such totes 106 can only be put on the lower two rows of vehicle compartments 143 in the delivery vehicle 109. If all totes 106 that are to be delivered by a given delivery vehicle 109 are packed as such, then none of the totes 106 can be put in the upper two rows of vehicle compartments 143. This would create a problem in that the delivery vehicle 109 could only be partially loaded with totes 106 for delivery. This would result in gross inefficiency of the delivery system.

Therefore, according to one embodiment, the items 103 of each order 113 are packed into totes 106 for delivery such that the resulting totes 106 that include the items 103 of the order 113 vary in weight according to the distribution of the weight limits of the varying vehicle compartments 143 of the delivery vehicle 109. Stated another way, totes 106 are packed for a respective order 113 such that the proportion of the weight of such totes 106 for a given order 113 are approximately equal to the proportion of the different weight limits associated with the respective vehicle compartments 143 in a delivery vehicle 109.

As stated above, it may be the case that a given order 113 may involve less than the total number of totes 106 to match the total different weight limits associated with the vehicle compartments 143. For example, if there are four different weight limits associated with the vehicle compartments 143 of a delivery vehicle 109, it may be the case that a given order 113 may have only enough items 103 to pack three or less totes 106 at varying weights. In such case, the totes 106 are packed with appropriate weights to match the weight limit distribution of the delivery vehicle 109 as much as possible.

In an alternative approach, the tote 106 may be packed with items 103 by pickers who move throughout the materials handling facility 100 to obtain items 103 from bins, shelves, or other inventory locations, placing such items 103 directly in the totes 103. Given that the weight of items 103 is generally known, the activity of the pickers may be orchestrated such that the various totes 103 are packed according to predefined weights such that the proportion of the weight of such totes 106 for a given order 113 are approximately equal to the proportion of the different weight limits associated with the respective vehicle compartments 143 in a delivery vehicle 109. The orchestration of the activity of the pickers is such that a predefined group of one or more items 103 are picked and included in a respective tote 103 so that it ultimately arrives at a predefined weight. In some cases, the weight of some items 103 such as produce, etc., might not be known with precision. As such, average weights can be assigned to such items 103, where a margin of error may be added to such average weights to ensure a tote 103 does not weigh more than planned.

Next, the progression of a given order 113 through the packing and loading portion of the materials handling facility 100 is described according to one embodiment. First, the items 103 associated with an order 113 are coalesced at a packing station or other location within the materials handling facility 100. Thereafter, a packer scans or otherwise enters an order 113 identifier associated with the order 113 to indicate the order 113 currently being packed to the fulfillment control system 136.

Then, the items 103 are placed in respective totes 106. The totes 106 are packed up to respective weights in proportion to the weight limit distribution associated with the vehicle compartments 143 of the delivery vehicle 109. To accomplish this, a first tote 106 may be packed up to a first one of the weight limits associated with the respective vehicle compartments 143. Thereafter, each subsequent tote 106 is packed up to subsequent weight limits until the entire order 113 is packed into totes 106. Scales may be employed at each packing station to ensure that totes 106 are packed up to respective weight limits. Once each tote 106 has been packed, the packer scans the tote identifier 126 of the tote 106 to associate the tote 106 with the respective order 113. In addition, the packer may enter the weight of the packed tote 106 to be stored in association with the tote identifier 126 that is stored in association with the respective order 113. The weight of the packed tote 106 is used in the placement of the tote 106 into a respective vehicle compartment 143 as will be described.

Alternatively, the totes 106 may be packed when a picker picks items 103 from inventory. Specifically, since the weights of items are generally known, the activity of the pickers may be orchestrated such that items 103 are packed in totes 106 that have specific weights as planned. Such totes 103 may be associated with an order 113 by being scanned by the picker who also inputs the order to which such totes 103 belong. This may be done at any point before the totes 103 proceed to the staging area to be loaded onto delivery vehicles 109.

Once a packer or picker has completed the packing of a given order 113 into respective totes 106 of varying weight and has scanned the tote identifiers 126 into the fulfillment control system 136 as described above, such packed totes 106 are then moved to be loaded onto a delivery vehicle 109. Also, the packer or picker may manipulate the input device 149 to transmit an indication that the packing of the respective order 113 is complete.

According to one embodiment, it is at this point that compartment assignments in a delivery vehicle 109 are generated for each of the totes 106 associated with a given order 113. Stated another way, in one embodiment, at this point the vehicle compartments 143 are allocated in the delivery vehicle 109 for the storage of packed totes 106 associated with a respective one of the orders 113 during delivery.

The placement of the packed totes 106 in a delivery vehicle 109 is determined based upon predefined placement criteria. In one embodiment, the placement criteria includes the fact that the packed totes 106 are placed in vehicle compartments 143 based upon the weight of the packed totes 106 and the weight limits associated with the respective vehicle compartments 143. In particular, each packed tote 106 is placed in a corresponding one of the vehicle compartments 143 based on the weight limits associated with the vehicle compartments 143 and the weight of the packed tote 106. In one embodiment, the predefined placement criteria dictates that each tote 106 is to be assigned to the respective one of the vehicle compartments 143 having a weight limit that is at least as great as the weight of the packed tote 106.

In addition, the placement criteria may further dictate that vehicle compartments 143 that store all of the totes 106 associated with a respective one of the orders 113 are to be clustered together to the extent possible. In this respect, it may be deemed desirable that the totes 106 holding items 103 of a given order 113 be placed in vehicle compartments 143 that are as close together as possible. This aids delivery personnel in quickly identifying the totes 106 associated with a given order 113 that are to be accessed when dropping off the totes 106 at a given stop. In one embodiment, the placement criteria further specifies that wherever possible, such totes 106 should be placed in adjacent ones of the vehicle compartments 143.

Further, the placement criteria may dictate that the one or more totes 106 associated with a respective one of the orders 113 are to be assigned to vehicle compartments 143 based on the relative position of the order 113 in the order of delivery of all orders 113 to be delivered by the respective delivery vehicle 109. According to one embodiment, it may be desirable to place the totes 106 associated with orders 113 that are delivered first along delivery routes toward the front end of the delivery vehicle 109 and moving back as further deliveries are made. This potentially liberates space in the front of a delivery vehicle 109 for the temporary storage of empty totes 106 picked up at various delivery stops that were used to deliver items 103 on prior occasions. As such, delivery personnel do not have to work their way around empty totes 106 to get to the packed totes 106 that have yet to be delivered. Thus, the placement of the totes 106 may depend in part upon the order of a respective delivery of an order 113 along a delivery route of the delivery vehicle 109.

In addition, there may be other placement criteria that are applied to determine precisely where totes 106 are to be placed within a delivery vehicle 109 for delivery.

In one embodiment, the allocation of vehicle compartments 143 for the storage of packed totes 106 for a given order 113 occurs upon scanning a tote identifier 126 of a first one of the one or more packed totes 106 that hold the items 103 for a respective order 113. In response to scanning a first one of such packed totes 106 for the order 113, the vehicle compartment allocation process 139 proceeds to identify vehicle compartments 143 for the placement of all of the packed totes 106 for the order 113.

Alternatively, the allocation of vehicle compartments 143 may occur any time a tote identifier 126 is scanned, whether this occurs after the tote 106 is packed by a packer or picker, or just before the tote 106 is placed on a delivery vehicle 109. To this end, each time a given tote identifier 126 is scanned, the vehicle compartment allocation process 139 may be configured to calculate the optimal placement of all of the current packed totes 106 that have not yet been placed on the delivery vehicle 109. When one or all of the totes 106 for a given order 113 are scanned just before being placed on a delivery vehicle 109, the placement of all of the current unplaced packed totes 106 may be recalculated. Likewise, when a newly packed tote 106 is scanned as described above, the placement of all of the current unpacked totes 106 may be recalculated in light of the addition of the new unpacked tote 106 into the pool of those that have not yet been placed on a delivery vehicle 109.

Thus, one may view this alternative approach as calculating an optimal configuration of vehicle compartments 143 for all of the packed totes 106 existing within a pool of those that are to be placed on a delivery vehicle 109 after they are packed. The calculation of placement of all of such packed totes 106 within such pool may occur any time a given one or more of the packed totes 106 are placed onto the delivery vehicle 109, or any time a newly packed tote 106 is added to the pool. To this end, the calculation of the placement of the totes 106 within the vehicle compartments 143 is performed any time the pool of packed totes 106 changes as can be appreciated.

Regardless of how each of the packed totes 106 is assigned to the respective vehicle compartments 143, when such packed totes 106 are actually to be placed on a delivery vehicle 109, personnel scan the tote identifier 126 of such packed totes 106 and the vehicle compartment allocation process 139 ultimately causes a compartment identifier 146 of the vehicle compartment 143 into which such tote 106 is to be placed to be rendered on a display device, printer, or other device to direct personnel to place the tote 106 in the respective vehicle compartment 143. The vehicle compartments 143 may be labeled with the compartment identifiers 146.

In addition, it may be the case that some of the orders 113 may only be partially packed into totes 106 for various reasons when it comes time to place packed totes 106 for such orders 113 in the delivery vehicle 109. In such case, the vehicle compartment allocation process 139 may be configured to input a manual designation of one or more virtual totes that are associated with a respective order 113. Alternatively, such virtual totes may be ascertained from the data that orchestrates the activity of the pickers in packing totes 103 directly from inventory locations. Such virtual totes are those estimated to be necessary to completely pack the respective order 113 that is still in the process of being packed. By designating virtual totes for respective orders 113 as such, the vehicle compartment allocation process 139 may proceed to allocate various vehicle compartments 143 for both the packed totes 106 and any virtual totes associated with the orders 113. By allowing personnel to input virtual totes with respect to given orders 113, this prevents partially or wholly unpacked orders 113 from slowing down or otherwise inhibiting the process of loading the delivery vehicle 109 for an efficient delivery of items 103 to customers.

Figure 2:
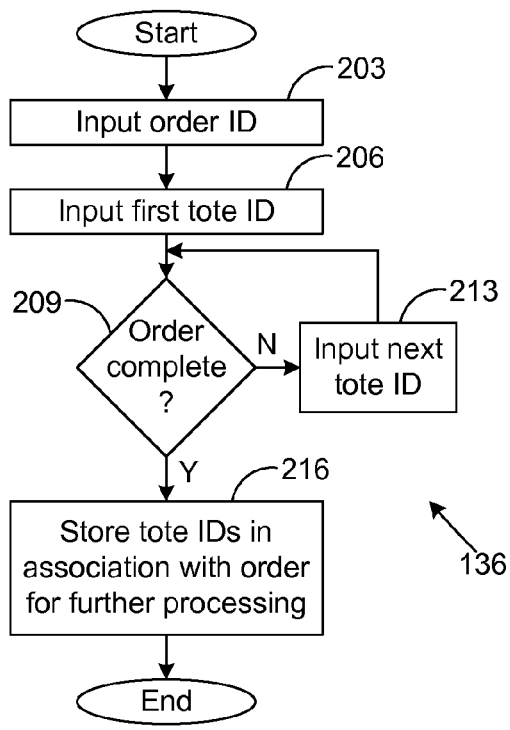
FIG. 2 is a flowchart that depicts functionality implemented in a computing resource associated with the materials handling facility of FIG. 1 according to various embodiments of the present disclosure.

With reference to FIG. 2, shown is a flowchart that depicts one example of functionality of the fulfillment control system 136 in associating totes 106 (FIG. 1) with orders 113 (FIG. 1) after such totes 106 have been packed with items 103 (FIG. 1). Alternatively, the flowchart of FIG. 2 may be viewed as steps of a method implemented in the computing resource 133 (FIG. 1) according to various embodiments.

To begin, a packer or picker first inputs the order identifier of a respective order 113 for which items 103 are to be packed in one or more totes 106 into the fulfillment control system 136. In order to input the order identifier, various input devices 149 (FIG. 1) may be employed such as, for example, a keyboard, scanner, or other input device as can be appreciated. The order identifier may be expressed on a manifest or in some other manner.

Once the fulfillment control system 136 knows which order 113 is to be packed by the packer or picker, then in box 206, the fulfillment control system 136 inputs the first tote identifier 126 (FIG. 1) scanned or otherwise input by the packer or picker. Thereafter, in box 209, the fulfillment control system 136 determines whether the order 113 has been completely packed in one or more totes 106 such that a current tote 106 is the last tote 106 for the order 113. This determination may be made by waiting to receive an input from the packer indicating that the packing of the order 113 is complete. Alternatively, the progress of packing an order 113 by a picker may be tracked by following which items 103 have been scanned by a picker and placed in a respective tote 106.

If the packing of the order 113 is not complete, then the fulfillment control system 136 proceeds to box 213 to await the input of the next tote identifier 126. Assuming that the next tote identifier 126 is input at such time, then the fulfillment control system 136 reverts back to box 209 as described above. Note that where timeout periods occur such that expected events do not happen, an error state may result as can be appreciated.

Assuming that the last tote 106 has been picked/packed for the given order 113 as determined in box 209, then the fulfillment control system 136 proceeds to box 216 to store all of the tote identifiers 126 in association with the respective order 113 in memory for further processing as will be described.

Figure 3:
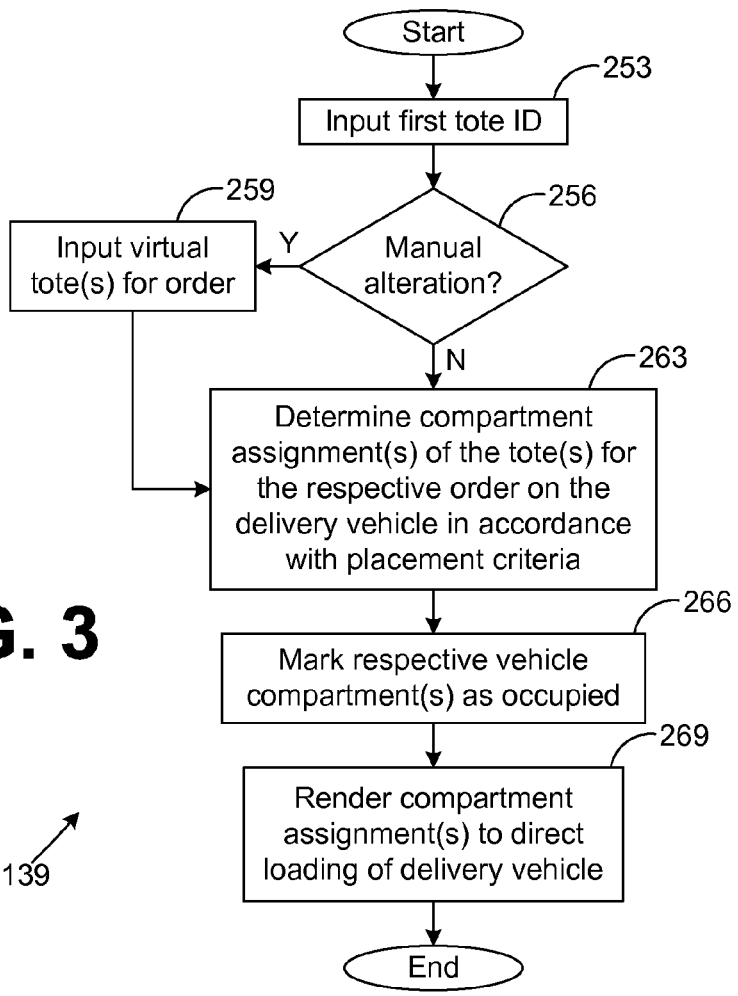
FIG. 3 is a flowchart that depicts functionality implemented in a computing resource for vehicle compartment allocation for deliveries from the materials handling facility of FIG. 1 according to various embodiments of the present disclosure.

With reference then to FIG. 3, shown is a flowchart that provides one example of the operation of the vehicle compartment allocation process 139 according to one embodiment of the present disclosure. Alternatively, the flowchart of FIG. 3 may be viewed as depicting steps of the method in the computing resource 133 (FIG. 1) according to various embodiments. The functionality depicted with respect to FIG. 3 involves determining vehicle compartment 143 (FIG. 1) assignments for packed totes 106 (FIG. 1) at the time such totes 106 are to be placed in the delivery vehicle 109 (FIG. 1) as described above.

To begin, the vehicle compartment allocation process 139 inputs the first tote identifier 126 (FIG. 1) associated with any one of the totes 106 that belong to a given order 113 (FIG. 1). This may be accomplished by scanning a tote identifier 126 associated with a given packed tote 106 (FIG. 1) as mentioned above. Alternatively, such a tote identifier 126 may be entered into the system in some other manner, for example, using a keyboard, microphone, or other input device 149 (FIG. 1).

Thereafter, in box 256, the vehicle compartment allocation process 139 determines whether there is to be a manual alteration of the totes 106 associated with a given order 113. Specifically, the vehicle compartment allocation process 139 may render a query on a display device for an operator to indicate whether there are additional totes 106 (i.e., virtual totes) expected for the respective order 113 or whether all of the items 103 (FIG. 1) associated with an order 113 have been packed into totes 106. This allows an operator to generate virtual totes as was described above. If the packing configuration of the respective totes 103 of an order 113 are already known due to the orchestration of the activity of the pickers in placing items 103 into respective totes 106, then boxes 256 and 259 (below) may be skipped accordingly.

Assuming that there is to be a manual alteration of the totes 106 associated with an order 113, then the vehicle compartment allocation process 139 proceeds to box 259. Otherwise, the same proceeds to box 263. In box 259, the vehicle compartment allocation process 139 receives an input of one or more totes 106 that have yet to be packed for the respective order 113. An estimated weight may be input in association with each of the virtual totes. Personnel may estimate the number of virtual totes and their associated weights based on the items 103 contained within the order 113 that have yet to be packed. Assuming that an individual has entered the number of virtual totes to be added and their corresponding weights to an order 113 in box 259, then the vehicle compartment allocation process 139 proceeds to box 263.

In box 263, the vehicle compartment allocation process 139 determines the compartment assignments for the packed totes 106 for the current order 113 on the delivery vehicle 109 in accordance with the placement criteria. To this end, the placement criteria used to generate vehicle compartment assignments in the delivery vehicle 109 for each of the totes 106 may include the fact that each tote 106 is to be assigned to a respective one of the vehicle compartments 143 that has a weight limit that is at least as great as the weight of the tote 106. Further, the placement criteria may dictate that each of the totes 106 associated with the order 113 are to be assigned to respective ones of the vehicle compartments 143 that are as close together as possible. Wherever possible, the placement criteria may specify that such vehicle compartments 143 be adjacent to each other. Further, the placement criteria may further dictate that each of the totes 106 associated with a respective one of the orders 113 are to be assigned to respective ones of the vehicle compartments 143 based upon a position of the respective one of the orders 113 in an order of delivery of all of the orders 113 to be delivered by the delivery vehicle 109. Such placement facilitates emptying the delivery vehicle 109 from front to back or back to front in order to liberate space for empty totes 106 picked up by customer sites that were deposited with previous deliveries and place them in the delivery vehicle 109 in a manner that they do not interfere with accessing later delivered totes 106 as mentioned above. In addition, the placement criteria may specify other rules to be taken into account in determining the placement of totes 106 within a delivery vehicle 109.

Once the vehicle compartment assignments for the respective totes 106 of a given order 113 have been determined, then in box 266, the respective vehicle compartments 143 associated with the assignments determined in box 263 are marked in the computing resource 133 as occupied to prevent their consideration for the placement of later loaded totes 106. Thereafter, in box 269, the vehicle compartment assignments are rendered to direct personnel to load such totes 106 into the delivery vehicle 109. Such vehicle compartment assignments may be rendered via a printer, display device, or other rendering device as can be appreciated.

Figure 4:
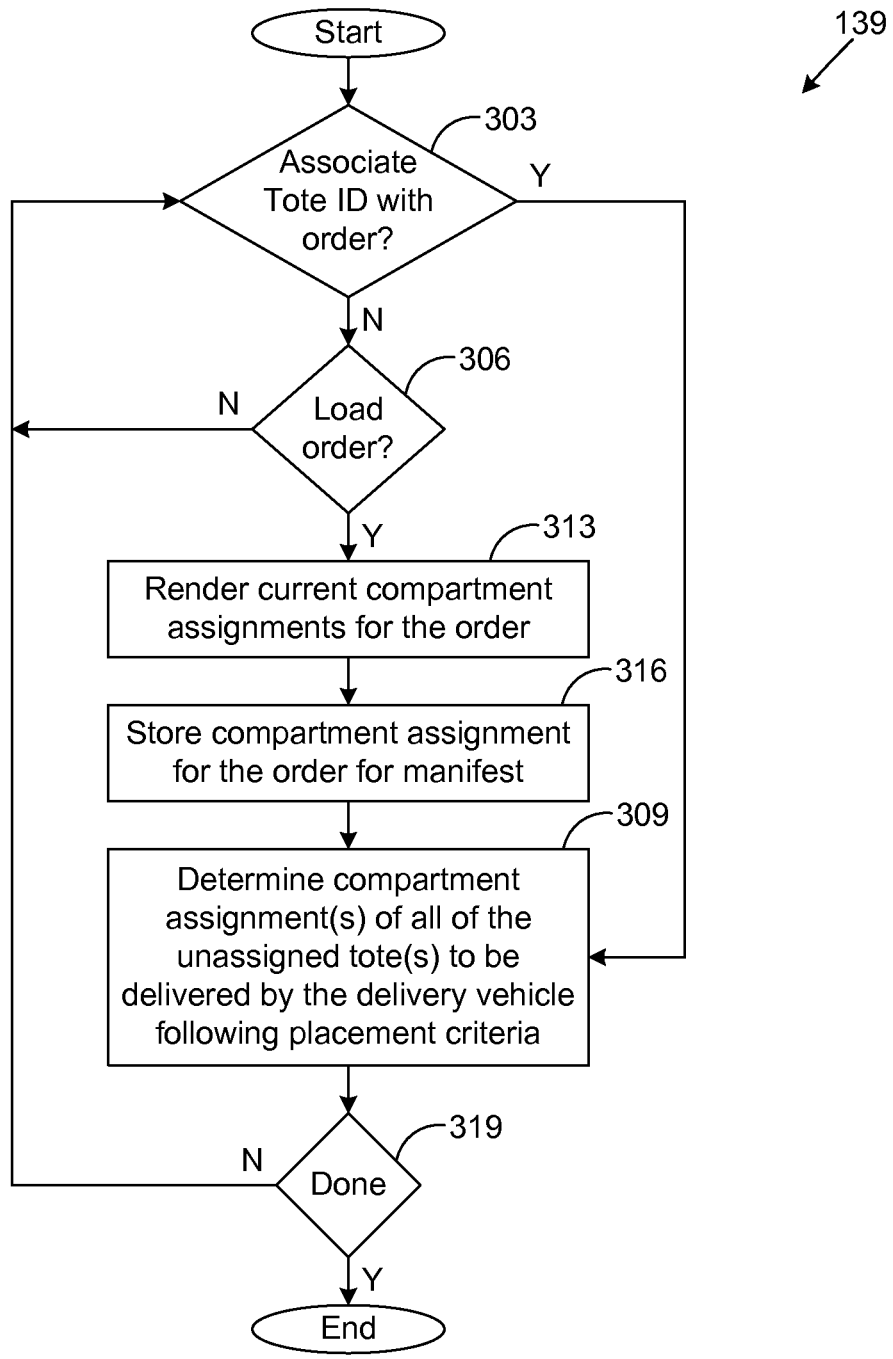
FIG. 4 is a flowchart that depicts alternative functionality implemented in a computing resource for vehicle compartment allocation for deliveries from the materials handling facility of FIG. 1 according to various embodiments of the present disclosure.

Referring next to FIG. 4, shown is a flowchart that provides an alternative example of the vehicle compartment allocation process 139 according to various embodiments. Alternatively, the flowchart of FIG. 4 may be viewed as depicting steps of a method implemented in the computing resource 133 (FIG. 1) according to various embodiments.

The alternative version of the vehicle compartment allocation process 139 depicted in FIG. 4 operates under the premise that at any given time during the fulfillment process before a delivery vehicle 109 (FIG. 1) is fully loaded, there is a pool of packed totes 106 (FIG. 1) that are to be loaded onto the delivery vehicle 109. The pool of packed totes 106 changes when the packed totes 106 associated with an order 113 (FIG. 1) are loaded onto the delivery vehicle 109 and when a tote 106 has been packed and scanned or otherwise entered into the system indicating that such tote 106 has now entered the pool of packed totes 106 to be loaded onto the delivery vehicle 109. The scanning of a newly packed tote 106 may be performed by a picker or a packer as they place items 103 into totes 106 as described above.

At any given time, a determination may be made as to the current optimum placement of all unloaded totes 106. In one embodiment, any event that changes the pool of packed totes 106 such as the addition of a new packed tote 106 or the loading of previously existing packed totes 106 onto the delivery vehicle 109 triggers the recalculation of optimum positions for the remaining packed totes 106. This assumes that changes in the pool of unpacked totes 106 may change the optimal placement of the current unpacked totes 106 in the delivery vehicle 109.

With this in mind, beginning in box 303, the vehicle compartment allocation process 139 determines whether a tote identifier 126 (FIG. 1) has been associated with a given order 113 by virtue of the fact that such tote identifier 126 was scanned in or otherwise entered into the system when packing the items 103 (FIG. 1) for a particular order 113. If this is not the case, then the vehicle compartment allocation process 139 proceeds to box 306. Otherwise, the vehicle compartment allocation process 139 jumps to box 309.

In box 306, the vehicle compartment allocation process 139 determines whether the totes 106 of an order 113 have been loaded onto the delivery vehicle 109 and placed in respective vehicle compartments 143 (FIG. 1). In such case, the first tote 106 of an order 113 may be scanned to identify the current vehicle compartments 143 to which the totes 106 for the respective order 113 have been assigned. Such vehicle compartments 143 are rendered for the personnel to proceed to load the totes 106 in question onto the delivery vehicle 109. In such case, such totes 106 have left the pool of packed totes 106 that are waiting to be loaded onto the delivery vehicle 109. Alternatively, totes 106 may be considered as leaving the pool of packed totes 106 on an individual basis as opposed to all totes 106 of an order 113.

If no totes 106 of an order 113 have been loaded onto the delivery vehicle 109 as determined in box 306, then the vehicle compartment allocation process 139 reverts back to box 303. Otherwise, the vehicle compartment allocation process 139 proceeds to box 313. Thus, the vehicle compartment allocation process 139 waits until a packed tote 106 is added to the pool of packed totes 106 waiting to be loaded, or until packed totes 106 are in fact loaded onto the delivery vehicle 109 either individually or together as an order 113 before proceeding with further action as described above.

In box 309, the vehicle compartment allocation process 139 proceeds to determine new vehicle compartment assignments for all of the unassigned totes 106 to be delivered by the delivery vehicle 109 following the placement criteria described above.

Assuming that one or more packed totes 106 are to be loaded onto the delivery vehicle 109 as determined in box 306, then in box 313 the vehicle compartment allocation process 139 causes the current vehicle compartment assignments for the one or more packed totes 106 to be rendered to personnel to facilitate loading onto the delivery vehicle 109. Such may be done by causing the vehicle compartment assignments to be rendered on a display device, a printer, or other device as can be appreciated.

In box 316, the vehicle compartment assignments are stored in memory so that they may be accessed in generating a manifest for the driver of the delivery vehicle 109 so that they can be made aware of which totes 106 are in which vehicle compartments 143 to facilitate the delivery of the orders 113. Thereafter, the vehicle compartment allocation process 139 proceeds to box 309 in order to determine new compartment assignments for all of the unassigned totes 106 as is mentioned above.

Thus, this version of the vehicle compartment allocation process 139 determines new compartment assignments for unassigned totes 106 when a change occurs to the pool of unassigned totes 106. Thereafter, in box 319, the vehicle compartment allocation process 139 determines whether the process is done. This may occur, for example, when loading of the delivery vehicle 109 is complete. If such is the case, then there is no need to further calculate vehicle compartment assignments for packed totes 106 as, presumably, there will be no further packed totes 106 to include on the delivery vehicle 109. If such is the case, then the vehicle compartment allocation process 139 ends as shown. Otherwise, the vehicle compartment allocation process 139 reverts back to box 303 described above.

Figure 5:
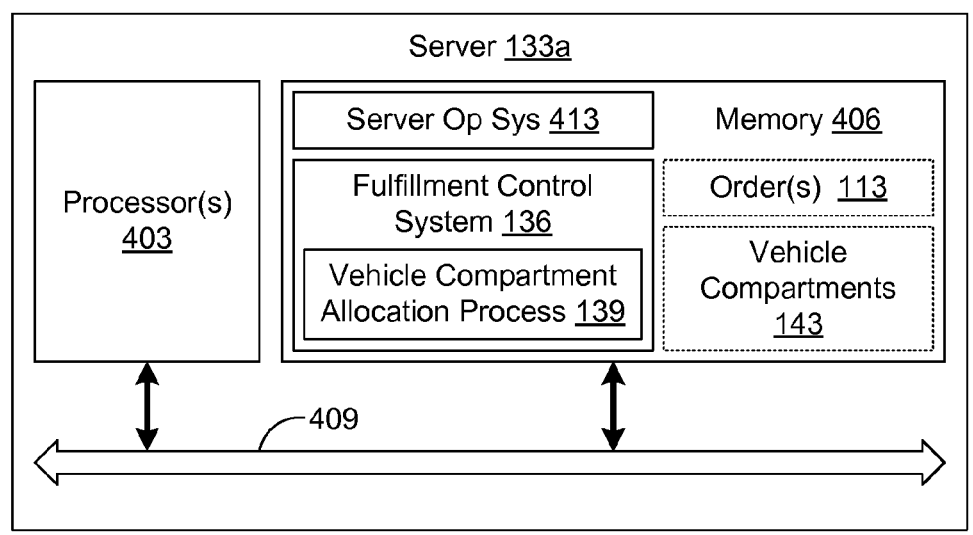
FIG. 5 is a schematic block diagram of one example of a computing resource employed in the materials handling facility of FIG. 1 according to various embodiments of the present disclosure.

Referring next to FIG. 5, shown is a schematic block diagram of one example of a computing resource 133 (FIG. 1) or computing device such as a server 133a according to an embodiment of the present disclosure. The server 133a includes at least one processor circuit, for example, having a processor 403 and a memory 406, both of which are coupled to a local interface 409. To this end, the server 133a may comprise, for example, a server computer or like device. The local interface 409 may comprise, for example, a data bus with an accompanying address/control bus or other bus structure as can be appreciated.

Stored in the memory 406 are data and several components and/or applications that are executable by the processor 403. In particular, stored in the memory 406 and executable by the processor 403 are a server operating system 413, the fulfillment control system 136 and potentially other applications such as an electronic commerce application, etc.

Also, stored in the memory 406 are various data components such as, for example, the orders 113 and the vehicle compartments 143 so as to be accessible to the processor 403. It is understood that other data may be stored in the memory 406 and accessed by the processors 403 beyond the data described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories, etc. The local interface 409 may comprise additional systems designed to coordinate this communication, including, for example, performing load balancing. The processor 403 may be of electrical or of some other available construction.

The various applications or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as the fulfillment control system 136 including the vehicle compartment allocation process 139 described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show examples of implementations of various functionality of the fulfillment control system 136 and the vehicle compartment allocation process 139 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, any two or more blocks shown in succession may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various systems, applications, processes, and/or other components described herein such as the fulfillment control system 136 and the vehicle compartment allocation process 139 comprise software or code, each can be embodied in any computer-readable medium for use by or in connection with an instruction execution system such as, for example, a processor in a computer system or other system. In this sense, the systems, applications, processes, or other components may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable by a computer system, comprising:
   code that tracks a plurality of totes corresponding to a plurality of orders fulfilled in a fulfillment center, each of the plurality of orders including at least one item and at least two of the plurality of totes; and
   code that assigns individual ones of the plurality of totes to a respective storage compartment in a delivery vehicle in accordance with a predefined placement criteria, the delivery vehicle having a plurality of storage compartments and wherein each of the plurality of storage compartments has a respective weight limit;
   wherein the predefined placement criteria specify that:
      a tote be assigned to a respective one of the plurality of storage compartments having a weight limit that is greater than a weight of the tote;
      the storage compartment be assigned to no more than a single tote; and
      the at least two of the plurality of totes of each order be assigned to adjacent ones of the plurality of storage compartments.

2. The non-transitory computer readable medium embodying the program executable by the computer system of claim 1, wherein the code that assigns individual ones of the plurality of totes to the respective storage compartment further comprises code that assigns the at least two of the plurality of totes for a respective order upon a scanning of an identifier of a first one of the plurality of totes for the respective order.

3. The non-transitory computer readable medium embodying the program executable by the computer system of claim 1, further comprising code that maintains an availability of the individual ones of the plurality of storage compartments in the delivery vehicle.

4. A system, comprising:
   at least one computing device;
   a plurality of orders specifying at least one item to be fulfilled in a fulfillment center, the plurality of orders maintained in a memory accessible to the at least one computing device;
   a plurality of totes corresponding to individual ones of the plurality of orders, each of the individual ones of the plurality of orders including at least two of the plurality of totes; and
   a vehicle compartment allocation process executable by the at least one computing device, the vehicle compartment allocation process being configured to:
      designate all of the at least two of the plurality of totes corresponding to a respective one of the plurality of orders to be loaded into a delivery vehicle, the delivery vehicle having a plurality of storage compartments, wherein each of the plurality of storage compartments has a respective weight limit; and
      allocate individual ones of the plurality of totes to a respective one of the plurality of storage compartments according to a predefined placement criteria, wherein a single one of the plurality of storage compartments is allocated to a respective single one of the plurality of totes;
   wherein the predefined placement criteria dictates that:
      a tote be assigned to the respective one of the plurality of storage compartments that has a weight limit that is greater than a weight of the tote;
      the storage compartment be assigned to no more than a single tote; and
      the at least two of the plurality of totes of each order be assigned to adjacent ones of the plurality of storage compartments.

5. The system of claim 4, wherein the vehicle compartment allocation process is further configured to track an availability of individual ones of the storage compartments in the delivery vehicle in the at least one computing device.

6. The system of claim 4, wherein the vehicle compartment allocation process is further configured to designate all of the at least two of the plurality of totes corresponding to the individual ones of the plurality of orders to be loaded into the delivery vehicle to the respective one of the plurality of storage compartments upon scanning of an identifier of a first one of the respective at least two of the plurality of totes.

7. The system of claim 4, wherein the vehicle compartment allocation process is further configured to:
   input a manual designation of a virtual tote that is associated with one of the plurality of orders; and
   allocate one of the plurality of storage compartments in the delivery vehicle for the virtual tote associated with the one of the plurality of orders.

8. A method, comprising:
   tracking, in at least one computing device, a plurality of totes corresponding to individual ones of a plurality of orders fulfilled in a fulfillment center, wherein each of the individual ones of the plurality of orders includes at least two of the plurality of totes; and
   assigning, in the at least one computing device, individual ones of the plurality of totes to individual ones of a plurality of storage compartments upon a scanning of an identifier of a first one of the at least two of the plurality of totes for a respective order, wherein the individual ones of the plurality of totes are assigned according to a predefined placement criteria, wherein each of the plurality of storage compartments has a respective weight limit;
   wherein the predefined placement criteria specify that:
      a tote be assigned to the respective one of the plurality of storage compartments that has a weight limit that is greater than a weight of the tote;
      a storage compartment be assigned to no more than a single tote; and
      the at least two of the plurality of totes of each order be assigned to adjacent ones of the plurality of storage compartments.

9. The method of claim 8, further comprising tracking respective availabilities of the plurality of storage compartments in a delivery vehicle in the at least one computing device.

10. The method of claim 8, wherein assigning, in the at least one computing device, individual ones of the plurality of totes to the individual ones of the plurality of storage compartments is performed when one of the at least two of the plurality of totes is first associated with one of the orders.

11. The method of claim 8, further comprising manually associating at least one virtual tote to one of the plurality of orders.

12. The method of claim 11, further comprising generating, in the at least one computing device, at least one compartment assignment in a delivery vehicle for the at least one virtual tote associated with the one of the plurality of orders.

13. A system, comprising:
   at least one computing device;
   a plurality of orders specifying at least one item to be fulfilled in a fulfillment center, the plurality of orders maintained in a memory accessible to the at least one computing device;
   at least two of a plurality of totes included in each of individual ones of the plurality of orders in the memory; and
   a vehicle compartment allocation process executable by the at least one computing device, the vehicle compartment allocation process being configured to:
   assign individual ones of the plurality of totes to individual ones of a plurality of storage compartments of a delivery vehicle, wherein individual ones of the plurality of totes are assigned to a respective single one of the plurality of storage compartments based upon a predefined placement criteria, wherein each of the plurality of storage compartments has a respective weight limit; and wherein the predefined placement criteria specify that:
      a tote be assigned to the respective one of the plurality of storage compartments that has a weight limit that is greater than a weight of the tote;
      a storage compartment be assigned to no more than a single tote; and
      the at least two of the plurality of totes of each order be assigned to adjacent ones of the plurality of storage compartments.

14. The system of claim 13, wherein the vehicle compartment allocation process is further configured to assign all of the plurality of totes upon a scanning of an identifier of a first tote associated with one of the plurality of orders.

\* \* \* \* \*